United States Patent [19]
Breyer et al.

[11] Patent Number: 5,681,917
[45] Date of Patent: Oct. 28, 1997

[54] LOW MOLE RATIO MELAMINE-UREA-FORMALDEHYDE RESIN

[75] Inventors: Robert A. Breyer, Tucker; Solona G. Hollis, Lithonia; Joseph J. Jural, deceased, late of Monticello, all of Ga., by Marion Jural, administratrix

[73] Assignee: Georgia-Pacific Resins, Inc., Atlanta, Ga.

[21] Appl. No.: 625,521

[22] Filed: Mar. 26, 1996

[51] Int. Cl.⁶ .................................................... C08G 12/34
[52] U.S. Cl. ...................... 528/256; 528/254; 528/261; 528/262; 524/593; 524/597; 524/843; 156/307.3; 156/331.3; 428/528
[58] Field of Search ...................... 528/254, 256, 528/261, 262; 524/593, 597, 843; 156/307.3, 331.3

[56] References Cited

U.S. PATENT DOCUMENTS

| | | |
|---|---|---|
| 2,315,400 | 3/1943 | D'Alelio . |
| 4,536,245 | 8/1985 | Shiau et al. . |
| 4,603,191 | 7/1986 | Kong . |
| 4,785,073 | 11/1988 | Farkas et al. . |
| 4,814,422 | 3/1989 | Diem et al. . |
| 4,997,905 | 3/1991 | Druet et al. . |
| 5,008,365 | 4/1991 | Druet et al. . |
| 5,162,462 | 11/1992 | Barthomieux et al. . |

*Primary Examiner*—James J. Seidleck
*Assistant Examiner*—Duc Truong
*Attorney, Agent, or Firm*—Banner & Witcoff, Ltd.

[57] ABSTRACT

A low mole ratio melamine-urea-formaldehyde resin useful as a binder for making a variety of products, and a method for making the resin. The melamine-urea-formaldehyde resin thus produced is stable and has low formaldehyde emissions (release).

18 Claims, No Drawings

LOW MOLE RATIO MELAMINE-UREA-FORMALDEHYDE RESIN

BACKGROUND OF THE INVENTION

1. Field of the Invention

This invention relates to a low mole ratio melamine-urea-formaldehyde ("MUF") resin composition, to methods of manufacturing the resin and using it, and to products prepared using the resin. More particularly, the invention relates to a storage-stable low mole ratio melamine-urea-formaldehyde resin composition which when cured exhibits a low formaldehyde emission. The resin is useful, for example, in adhesives or binders for composite board products.

2. Description of Related Art

Typically, when a urea-formaldehyde resin is used as a binder for composite boards, the boards release a significant amount of formaldehyde into the environment during cure. Formaldehyde also can be released subsequently from the cured resin, particularly when the cured resin is exposed to acidic environments. Such formaldehyde release is undesirable, particularly in enclosed environments. In such environments, formaldehyde is inhaled by workers and comes into contact with the eyes, the mouth, and other parts of the body. Formaldehyde is malodorous and is thought to contribute to human and animal illness.

Various techniques have been used to reduce formaldehyde emission from urea-formaldehyde resins. Use of formaldehyde scavengers and various methods for resin formulation, including addition of urea as a reactant late in the resin synthesis, are techniques often used in an attempt to reduce formaldehyde emission. However, use of a formaldehyde scavenger often is undesirable, not only because of the additional cost, but also because it affects the characteristics, or properties, of the cured resin. For example, using ammonia as a formaldehyde scavenger often reduces the resistance of the cured resin to hydrolysis (degradation). Later addition of urea to reduce free formaldehyde concentration in the resin generally yields a resin that must be cured at a relatively low temperature to avoid smoking. Resin stability also can be adversely effected by such treatments.

Another method of reducing free formaldehyde is to reduce the mole ratio of formaldehyde to urea used in the resin synthesis. For example, U.S. Pat. No. 4,536,245 relates to a process of preparing a purportedly low formaldehyde emission, urea-formaldehyde resin containing a melamine additive having a final molar ratio of formaldehyde to urea-equivalent of 0.7:1 to 1.3:1.

U.S. Pat. No. 4,997,905 discloses the preparation of aminoplast resins claimed to have very low formaldehyde emission rates and to be particularly useful in the production of particle boards. The process comprises condensing urea and formaldehyde in a first reaction stage at an acidic pH between 4.5 and 6 in quantities such that the F/NH$_2$ molar ratio at this stage is between 0.9 and 1.5, adding more urea and melamine in a second reaction stage and reacting at a pH of between 6 and 9 such that the resin's F/NH$_2$ ratio is reduced to between about 0.5 and 0.9, and in a third reaction stage, adding urea in a quantity such that the resin's final F/NH$_2$ molar ratio is between 0.30 and 0.50.

U.S. Pat. No. 5,008,365 describes a process for the preparation of a urea-formaldehyde resin containing not more than 10% melamine and exhibiting a final F/NH$_2$ molar ratio of between 0.5 and 0.575. U.S. Pat. No. 4,603,191 is also directed to a process for preparing a urea-formaldehyde resin having a very low mole ratio of formaldehyde to urea. U.S. Pat. No. 5,162,462 relates to a process for the preparation of aminoplast resins claimed to have a low formaldehyde emission for use in particle boards.

U.S. Pat. No. 4,785,073 discloses a molding composition produced by co-condensing phenol and melamine with formaldehyde. Alternatively, the composition can be produced, inter alia, by condensing a phenol-formaldehyde resole precondensate with melamine. The reaction is conducted under mild alkaline conditions. U.S. Pat. No. 2,315,400 discloses a thermosetting resin composition comprising the reaction product of a methylolated phenol (resole) and melamine useful for casting, molding, coating, and impregnating applications. The patent stresses the importance of adding the melamine before initiating any condensation reaction between methylolated species. The melamine then is said to condense with the methylolated species. This is promoted by completing the reaction at an acidic pH (Col. 3 (page 2), lines 3–30).

To date, low mole ratio urea-formadehyde resin adhesives and binders have not been capable of producing a board of acceptable physical properties, along with low formaldehyde emissions. The current technology of back-adding melamine to a UF resin or back-adding urea to an MF polymer does not provide the desired results. In these resins, either emissions are not substantially reduced and/or the desired board properties are adversely affected. Thus, although a number of patents disclose melamine modification of urea-formaldehyde resins, none discloses a particular combination of reaction conditions and melamine addition which provides a low mole ratio melamine-urea-formaldehyde resin having both low formaldehyde emissions and acceptable board properties.

SUMMARY OF THE INVENTION

The present invention is directed to a method of preparing a low mole ratio storage-stable melamine-urea-formaldehyde ("MUF") resin having a low level of formaldehyde emission for use in making composite boards. As used herein, low mole ratio melamine-urea-formaldehyde means a formaldehyde to urea and melamine mole ratio of less than about 1.1 and preferably between about 0.5 and 1.1. The resin, prepared in accordance with the claimed invention, yields a product that, when used to produce composite board, results in acceptable board properties (internal bond strengths and water resistance) and low formaldehyde emissions. The final resin has a free formaldehyde level of less than 0.1%. The shelf life of the final resin is at least three to four weeks.

The MUF resin of the present invention is prepared by:

(a) reacting an aqueous mixture of formaldehyde and urea at an F/U mole ratio of about 1.9 to 2.6 under an alkaline condition;

(b) thereafter adding a sufficient mount of a mild acid to reduce the pH of said mixture to about 5.0 to 5.7 and further reacting the mixture;

(c) neutralizing the mixture to a pH of between about 6.5 and 6.9;

(d) adding additional formaldehyde to said mixture, and then adding melamine in an amount of about 2 to 10 wt % based on the total mixture weight, to achieve a cumulative F/(U+M) mole ratio of about 1.9 to 2.6 and continuing the reaction at a pH of about 6.2 to 6.9;

(e) adding additional melamine to said mixture to achieve a cumulative F/(U+M) mole ratio of about 1.7 to 2.4;

(f) adjusting the pH to about 7.6 to 8.0; and (g) then adding sufficient urea to produce a final mole ratio of F/(U+M) of about 0.5 to 1.1.

DETAILED DESCRIPTION OF THE INVENTION

The invention is based on the discovery that a storage-stable, low mole ratio MUF resin produced in accordance with the present invention exhibits improved control of formaldehyde emissions and a faster rate of cure than similar polymers made using conventional methods. The cook procedure of the present invention produces a storage-stable resin that, when used as an adhesive in the manufacture of composite board at normal resin application level, produces boards that exhibit an E-0 emission standard (background wood emissions). The resin, if used as an adhesive in the face regions only, provides emissions at substantially below the E-1 emission standard (voluntary 0.1 ppm emission standard). E-0 and E-1 standards are European Economic Standards based on the perforator test.

The resin cook involves reacting the urea, formaldehyde and melamine in accordance a specific pattern that is believed to form a block co-polymer. A urea-formaldehyde polymer is formed first, then melamine is added and the melamine attaches to the urea-formaldehyde polymer and extends the polymer. Thus, the polymeric structure of the resin, as evidenced by NMR analysis, is altered from that produced by standard MUF cook techniques where the three monomers are co-reacted.

The MUF resin of the present invention is prepared by a specific program of reacting formaldehyde with urea and then with melamine under controlled mole ratios and reaction conditions. According to the invention, the melamine-urea-formaldehyde resin is prepared according to the following steps:

(a) An aqueous mixture of formaldehyde and urea is reacted at an F/U mole ratio of about 1.9 to 2.6, preferably about 2.1, under an alkaline condition.

(b) Thereafter, a sufficient amount of a mild acid is added to reduce the pH of the mixture to about 5.0 to 5.7, preferably about 5.4 to 5.6, and the mixture is reacted further.

(c) The mixture then is neutralized to a pH between about 6.5 and 6.9.

(d) Thereafter, additional formaldehyde is added to the mixture, and then melamine in an amount of about 2 to 10 wt %, preferably about 2 to 6 wt %, based on the total mixture weight, is added to the mixture, to achieve a cumulative F/(U+M) mole ratio of about 1.9 to 2.6, preferably about 2.1 to 2.5, and, most preferably about 2.4, and the reaction is continued at a pH about 6.2 to 6.9, preferably about 6.5 to 6.9.

(e) Additional melamine is added to the mixture to achieve a cumulative F/(U+M) mole ratio of about 1.7 to 2.4.

(f) The pH of the mixture is adjusted to about 7.6 to 8.0.

(g) Sufficient urea is added to produce a final mole ratio of F/(U+M) of about 0.5 to 1.1, preferably about 0.5 to 0.8, and, most preferably, about 0.65. The free formaldehyde level of the resulting resin is less than 0.1%.

The melamine and urea mole ratio is calculated based on the number of active nitrogen sites in each compound.

The amount of time sufficient for the reaction to proceed to the desired extent at each step varies, depending on the particular reaction conditions including pH and temperature. Based on this disclosure, it and is within the skill of the an to vary the conditions to obtain a particular result. Generally, the initial reaction of step (a) is continued until a Gardner viscosity of about G is reached. After the additional formaldehyde and melamine are added in step (d), the reaction proceeds until a Gardner viscosity of about L is reached. After the melamine is added in step (e), the reaction proceeds until a Gardner viscosity of about T is reached. The temperature is generally maintained between about 70° and 100° C. during each step of the reaction in order to advance the resin.

An alkaline condition may be established and maintained in step (a) by adding an alkaline agent which promotes the desired reaction and provides the proper pH conditions. Typical agents include, but are not limited to triethanolamine, alkali metal hydroxides such as sodium, lithium or potassium hydroxide, preferably sodium hydroxide, or other alkaline compounds such as alkali metal carbonates, alkaline earth hydroxides, organic amines. Preferably, triethanolamine is used to establish the initial alkaline condition and sodium hydroxide is added to maintain the alkalinity, as needed. In accordance with the present invention, an alkaline condition is a pH is above 6.7 and preferably is between about 7 and 7.9.

Following this first step, a sufficient amount of a mild acid is added to adjust the pH to an acidic value that permits good control of the rate of condensation with a preferred pH being about 5.0 to 6.5, preferably about 5.4 to 5.6. Mild acids include dilute mineral acids, organic acids or acid salts, such as ammonium chloride, ammonium sulfate, etc., or alum that are diluted to a controlled concentration. Usually about 15 to 25 wt % solution of the acid in water. Preferred mild acids include about 20 wt % solutions of either formic acid or ammonium sulfate. The amount of mild acid required to adjust the pH depends on various conditions within the reaction mixture and the particular mild acid used, and can easily be determined.

The acidic reaction medium may be neutralized with any appropriate alkaline neutralizing agent known in the art, such as an alkali metal hydroxide, alkali metal carbonates, alkaline earth hydroxides, or organic amines, as described above. Preferably, the mixture is neutralized with triethanolamine or sodium hydroxide.

The pH of the reaction mixture in steps (c) and (d) may also be established by adding an alkaline agent as described above. Preferably, sodium hydroxide is used to maintain the pH at this step.

The alkaline pH of the reaction mixture in step (f) is preferably established using a suitable amount of triethanolamine, although any other alkaline agent may be used to adjust the alkalinity of the reaction mixture such as those used in (a).

Skilled practitioners recognize that the reactants are commercially available in many forms. Any form which can react with the other reactants and which does not introduce extraneous moieties deleterious to the desired reaction and reaction product can also be used in the preparation of the melamine-urea-formaldehyde resin of the invention.

Formaldehyde is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another monomer, most typically formaldehyde and urea-formaldehyde, often in aqueous solution. Any form of urea or urea in combination with formaldehyde is suitable for use in the practice of the invention. Both urea prill and combined urea-formaldehyde products are preferred, such as Urea Formaldehyde Concentrate or UFC 85. These types of products are disclosed in, for example, U.S. Pat. Nos. 5,362,842 and 5,389,716.

Although melamine is specifically mentioned, in the practice of this invention, the melamine may be totally or partially replaced with other aminotriazine compounds. Other suitable aminotriazine compounds include substituted melamines, or cycloaliphatic guanamines, or mixtures thereof. Substituted melamines include the alkyl melamines and aryl melamines which can be mono-, di-, or tri-substituted. In the alkyl substituted melamines, each alkyl group can contain 1–6 carbon atoms and, preferably 1–4 carbon atoms. Typical examples of some of the alkyl-substituted melamines are monomethyl melamine, dimethyl melamine, trimethyl melamine, monoethyl melamine, and 1-methyl-3-propyl-5-butyl melamine. In the aryl-substituted melamines, each aryl group can contain 1–2 phenyl radicals and, preferably, 1 phenyl radical. Typical examples of an aryl-substituted melamine are monophenyl melamine and diphenyl melamine.

Any of the cycloaliphatic guanamines can be employed in the practice of this invention. Preferably, the cycloaliphatic guanamines should not have more than 15 carbon atoms. Typical examples of some of the cycloaliphatic guanamines are tetrahydrobenzoguanamine, hexahydrobenzoguanamine, 3-methyl-tetrahydrobenzoguanamine, 3-methylhexahydrobenzoguanamine, 3,4-dimethyl-1,2,5,6-tetrahydrobenzoguanamine, and 3,4-dimethylhexahydrobenzoguanamine and mixtures thereof. A preferred cycloaliphatic guanamine is tetrahydrobenzoguanamine. Mixtures of aminotriazine compounds include melamine and an alkyl-substituted melamine, such as dimethyl melamine, or melamine and a cycloaliphatic guanamine, such as tetrahydrobenzoguanamine.

The reactants may also include a small mount of a resin modifier such as ethylenediamine (EDA). Additional modifiers, such as ethylene ureas, and primary, secondary and tertiary amines, for example, dicyanodiamide can also be incorporated into the resin of the invention. Concentrations of these modifiers in the reaction mixture may vary from 0.05 to 5.00%. These types of modifiers may promote hydrolysis resistance, polymer flexibility and lower formaldehyde emissions. Ammonia may also be added as within the skill of the art.

The resin of the invention also is advantageously used in the preparation of composite boards. The resin provides adhesive compositions that when cured exhibit an E-0 emission while maintaining acceptable board properties when used in either the face or core regions of a composite board.

All types of composite boards that have been prepared with UF resins can be made with the resin of the present invention. Composite boards include, but are not limited to, particle boards, medium density fiber board (MDF), and Mende board. The MUF resin of the present invention can be used an adhesive in both the core and the face regions of the composite board.

The following examples are for purposes of illustration and are not intended to limit the scope of the claimed invention.

EXAMPLES

Example 1

50% formaldehyde solution (about 26 parts by weight (pbw)) is loaded into a reactor. The pH is adjusted with 85% triethanolamine (about 0.05 pbw) to pH 7.2–7.8. Urea (about 12 pbw) is then added into the reactor, and the reaction mixture is heated to 95° C. and then held at 95° C. for 20 minutes. During this time, 25% caustic is added as needed to maintain the pH above 6.7. The pH is then adjusted to about 5.4 to 5.6 with 20% ammonium sulfate, and the resin is then held at 95° C. to a Gardner viscosity of G. The reaction mixture is then neutralized slightly on the acid side with 85% triethanolamine (0.03 wt %) while cooling to 80° C. 50% formaldehyde solution (about 10 pbw) is added, and the pH adjusted as needed with 25% sodium hydroxide to a pH of about 6.5 to 6.9. Melamine (about 5 pbw) is added, and the mixture is then reacted at 75° C. to a Gardner viscosity of L, while maintaining a neutral pH. Melamine (about 2 pbw) is added. The reaction mixture is reacted at 70°–75° C. until a Gardner viscosity target of T is reached. The pH is adjusted to 7.6–8.0 with triethanolamine while cooling to 70° C. Urea (about 39 pbw) and fresh water (about 6 pbw) are added. The reaction mixture is cooled to 50°–55° C. and held until all of the urea dissolves. If necessary, the pH is adjusted to 7.6–8.0. The mixture is then cooled to 25° C. During cooling at below 45° C., an ammoniated salt catalyst (1.00%) is added to increase up the cure rate of the resin.

A resin was prepared in accordance with the above description. The resulting resin was evaluated to determine formaldehyde emissions and physical properties. The resin was applied to the face of a composite board (example 1a) and to both the face and core of a composite board (example 1b). The core in example 1a contained a standard UF resin. The resin produced a board having significantly lower formaldehyde emissions when used in the core and face. The resin in the face (example 1a) only produced DMC (Dynamic Micro Chamber) formaldehyde emission results ranging from 0.101 to 0.118 ppm (below E-1 standard). DMC is a commercial chamber sold by Georgia Pacific and is patented under U.S. Pat. No. 5,286,363. The resin in both the core and the face (example 1b) provided DMC formaldehyde emission results ranging from 0.033 to 0.041 ppm (E-0 standard).

Example 2

Preparation of the Low Mole Ratio MUF Resin

50% formaldehyde solution (about 26 parts by weight (pbw)) is loaded into a reactor. Fresh water is added (about 0.5 %). The pH is adjusted with 85 % triethanolamine (about 0.03 pbw) and 50% caustic (about 0.0001 pbw) to pH 7.6. Urea (about 12 pbw) is then added into the reactor, and the reaction mixture is heated to about 95° C. and then held at 95° C. for 20 minutes. During this time, 50% caustic is added as needed to maintain the pH above 6.7. The pH is then adjusted to about 5.5 with 16% formic acid (about 0.0001 pbw) and the resin is then held at about 95° C. to a Gardner viscosity of G. The reaction mixture is then neutralized slightly on the acid side with 85% triethanolamine (0.02 wt %) while cooling to 80° C. 50% formaldehyde solution (about 10 pbw) is added, and the pH adjusted as needed with 50% caustic to a pH of about 6.8. Melamine (about 5 pbw) is added, and the mixture is then reacted at about 75° C. to a Gardner viscosity of L, while maintaining a neutral pH. Melamine (about 2 pbw) is added. The temperature is reduced to about 70° C. The reaction mixture is reacted until a Gardner viscosity target of T is reached. The pH is adjusted to about 7.8 with 85% triethanolamine (0.02 pbw) and 50% caustic (about 0.0001 pbw). Urea (about 39 pbw) and fresh water (about 5 pbw) are added. The reaction mixture is cooled to about 50° C. and held for 20 minutes. The mixture is then cooled to 25° C. During cooling, sodium sulfate (1.00 pbw) is added and mixed for at least 10 minutes. The pH is then adjusted with 50% caustic and 7.5% formic acid as needed to obtain a pH of about 7.8.

Example 3

A series of resins, including a 1.1 mole ratio UF resin and MUF resin and 0.64 mole ratio UF resin and MUF resin, were synthesized. These were used to make boards at different resin applications (6, 12, 14 wt %). The lower mole ratio resins were prepared by increasing the level of back-added urea to the higher mole ratio resins. One result of this was that the lower mole ratio resins had a higher level of resin solids.

| Resin | Mole Ratio[1] | Usage[2] | IB[3] | Cs[4] |
|---|---|---|---|---|
| UF | 1.1 | 6 | 120 | 0.574 |
| UF | 1.1 | 12 | 180 | 0.413 |
| UF | 0.64 | 6 | 72 | 0.065 |
| UF | 0.64 | 12 | 58 | 0.043 |
| MUF | 1.1 | 6 | 113 | 0.372 |
| MUF | 1.1 | 12 | 157 | 0.343 |
| MUF | 0.64 | 6 | 97 | 0.065 |
| MUF | 0.64 | 12 | 125 | 0.043 |
| MUF | 0.64 | 14 | 181 | 0.038 |

[1] Mole ratio of formaldehyde to urea or to urea and melamine.
[2] The amount of resin (wt. % basd on dry weight of furnish vs. resin solids.) applied to the furnish (wood).
[3] Internal Bond Strength. 2" × 2" blocks are cut and pulled apart on an Instron tester
[4] Formaldehyde emissions value, ppm.

The low mole ratio UF resins (0.64) performed as expected. The formaldehyde emissions were low but the internal bond strength was less than normal commercial standards. The low mole ratio MUFs performed well at all usage levels in both emissions and board strength. At the 12% and above resin treatment, the low mole ratio MUF resin gave board strengths that were comparable to a high mole ratio UF resin at 6 % treatment, and had a factor of ten reduction in emissions. This level of emissions is comparable to phenolic bonded particleboard. The water soak data showed that the low mole ratio MUF resins at the 14% level gave a substantial improvement in the water resistance. The co-polymerized MUF resin at the high mole ratio had results similar to the high mole ratio UF resin in board properties, but was much improved in emissions. In addition, the low mole ratio MUF had improved storage life compared to the corresponding low mole ratio UF resin.

It is claimed:

1. A method of preparing a storage-stable low mole ratio melamine-urea-formaldehyde resin having a formaldehyde to urea and melamine ratio of between about 0.5 and 1.1, comprising:
   (a) reacting an aqueous mixture of formaldehyde and urea at an F/U mole ratio of about 1.9 to 2.6 under an alkaline condition;
   (b) thereafter adding a sufficient amount of a mild acid to reduce the pH of said mixture to about 5.0 to 5.7 and further reacting the mixture;
   (c) neutralizing the mixture to a pH of between about 6.5 and 6.9;
   (d) adding additional formaldehyde to said mixture, and then adding melamine in an amount of about 2 to 10 wt % based on total mixture weight, to achieve a cumulative F/(U+M) mole ratio of about 1.9 to 2.6 and continuing the reaction at a pH of about 6.2 to 6.9;
   (e) adding additional melamine to said mixture to achieve a cumulative F/(U+M) mole ratio of about 1.7 to 2.4;
   (f) adjusting the pH to about 7.6 to 8.0; and
   (g) then adding sufficient urea to produce a final F/(U+M) mole ratio of about 0.5 to 1.1.

2. The method of claim 1 wherein in (a) the F/U mole ratio is about 2.1.

3. The method of claim 1 wherein in (b) the pH is reduced to about 5.4 to 5.6.

4. The method of claim 1 wherein in (a) the pH is between about 7.0 and 7.9.

5. The method of claim 1 wherein in (d) the cumulative F/(U+M) ratio is about 2.4.

6. The method of claim 1 wherein the resin is neutralized with sodium hydroxide.

7. The method of claim 1 wherein the alkaline conditions are established with in (a) with triethanolamine.

8. The method of claim 1 wherein the pH in step (f) is adjusted with a suitable amount of triethanolamine.

9. A storage-stable low mole milo melamine-urea-formaldehyde resin having a formaldehyde to urea and melamine ratio of between about 0.5 and 1.1 prepared by:
   (a) reacting an aqueous mixture of formaldehyde and urea at an F/U mole ratio of about 1.9 to 2.5 under an alkaline condition;
   (b) thereafter adding a sufficient amount of a mild acid to reduce the pH of said mixture to about 5.0 to 5.7 and further reacting the mixture;
   (c) neutralizing the mixture to a pH of between about 6.5 and 6.9;
   (d) adding additional formaldehyde to said mixture, and then adding melamine in an amount of about 2 to 10 wt % based on mixture weight, to achieve a cumulative F/(U+M) mole ratio of about 1.9 to 2.6 and continuing the reaction at a pH of about 6.2 to 6.9;
   (e) adding additional melamine to said mixture to achieve a cumulative F/(U+M) mole ratio of about 1.7 to 2.4;
   (f) adjusting the pH to about 7.6 to 8.0; and
   (g) then adding sufficient urea to produce a final F/(U+M) mole ratio of about 0.5 to 1.1.

10. The resin of claim 9 wherein in (a) the F/U mole ratio is about 2.1.

11. The resin of claim 9 wherein in (b) the pH is reduced to about 5.4 to 5.6.

12. The resin of claim 9 wherein in (a) the pH is between about 7.0 and 7.9.

13. The resin of claim 9 wherein in (d) the cumulative F/(U+M) ratio is about 2.4.

14. The resin of claim 9 wherein the resin is neutralized with sodium hydroxide.

15. The resin of claim 9 wherein the alkaline conditions in (a) are established with triethanolamine.

16. The resin of claim 9 wherein the pH in step (f) is adjusted with a suitable amount of triethanolamine.

17. In a composite board comprising wood and an adhesive, the improvement wherein the adhesive comprises the resin of claim 9.

18. In a process for the production of composite boards comprising applying an adhesive to the face or the face and the core of a composite board, the improvement which comprises employing as the adhesive the resin of claim 9.

* * * * *